US010266755B2

United States Patent
Barthelmess et al.

(10) Patent No.: US 10,266,755 B2
(45) Date of Patent: *Apr. 23, 2019

(54) CERAMIC PARTICLES FORMED FROM PERFORATED MEMBRANES

(71) Applicant: SCHLUMBERGER TECHNOLOGY CORPORATION, Sugar Land, TX (US)

(72) Inventors: Thomas Philip Barthelmess, Barcelona (ES); Joachim Roettle, Barcelona (ES)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/033,695

(22) PCT Filed: Nov. 14, 2014

(86) PCT No.: PCT/US2014/065587
§ 371 (c)(1),
(2) Date: May 2, 2016

(87) PCT Pub. No.: WO2015/077130
PCT Pub. Date: May 28, 2015

(65) Prior Publication Data
US 2016/0272880 A1    Sep. 22, 2016

Related U.S. Application Data

(60) Provisional application No. 61/905,943, filed on Nov. 19, 2013.

(51) Int. Cl.
| | | |
|---|---|---|
| *E21B 43/267* | (2006.01) | |
| *C09K 8/80* | (2006.01) | |
| *C04B 35/622* | (2006.01) | |
| *C04B 35/632* | (2006.01) | |
| *B28B 3/26* | (2006.01) | |

(Continued)

(52) U.S. Cl.
CPC ............... *C09K 8/80* (2013.01); *B01J 13/00* (2013.01); *B01J 19/06* (2013.01); *B28B 3/26* (2013.01);
(Continued)

(58) Field of Classification Search
CPC ........... C09K 8/80; C09K 8/805; E21B 43/26; E21B 43/267
See application file for complete search history.

(56) References Cited

U.S. PATENT DOCUMENTS 8,490,698 B2    7/2013  Panga et al.
8,728,991 B2    5/2014  Wu et al.
(Continued)

FOREIGN PATENT DOCUMENTS

| WO | 2006010036 A2 | 1/2006 |
| WO | 2012177625 A1 | 12/2012 |
| WO | 2015077130 A1 | 5/2015 |

OTHER PUBLICATIONS

Office Action issued in Chinese Patent Application No. 201480063336.0 dated Dec. 5, 2017; 15 pages (with English translation).
(Continued)

*Primary Examiner* — Zakiya W Bates
(74) *Attorney, Agent, or Firm* — Andrea E. Tran

(57) ABSTRACT

Methods and apparatus for forming proppant particles which include providing an aqueous slurry of ceramic forming raw materials, flowing the slurry through a perforated membrane, which may be energized, to form slurry bodies, receiving the slurry bodies in a collecting hopper, and drying the slurry bodies to form particles. In some aspects, the slurry is energized as it flows through the perforated membrane.

26 Claims, 13 Drawing Sheets

(51) Int. Cl.
  *C04B 35/628* (2006.01)
  *C04B 35/64* (2006.01)
  *B01J 13/00* (2006.01)
  *B01J 19/06* (2006.01)
  *C04B 35/626* (2006.01)
  *E21B 43/26* (2006.01)

(52) U.S. Cl.
  CPC .......... *C04B 35/622* (2013.01); *C04B 35/626* (2013.01); *C04B 35/628* (2013.01); *C04B 35/632* (2013.01); *C04B 35/64* (2013.01); *C09K 8/805* (2013.01); *E21B 43/26* (2013.01); *E21B 43/267* (2013.01); *B01J 2219/2423* (2013.01); *C04B 2235/528* (2013.01); *C04B 2235/5427* (2013.01); *C04B 2235/5436* (2013.01); *C04B 2235/5445* (2013.01); *C04B 2235/5481* (2013.01); *C04B 2235/6023* (2013.01); *C04B 2235/612* (2013.01); *C04B 2235/94* (2013.01)

(56) References Cited

U.S. PATENT DOCUMENTS

| | | |
|---|---|---|
| 2007/0144736 A1 | 6/2007 | Shinback et al. |
| 2008/0241540 A1 | 10/2008 | Canova et al. |
| 2009/0044945 A1 | 2/2009 | Willberg et al. |
| 2010/0326657 A1 | 12/2010 | Hellmann et al. |
| 2012/0190597 A1 | 7/2012 | Chatterjee et al. |
| 2012/0227968 A1 | 9/2012 | Eldred et al. |
| 2012/0231981 A1 | 9/2012 | Eldred et al. |
| 2013/0025862 A1 | 1/2013 | Eldred et al. |
| 2014/0131045 A1 | 5/2014 | Loiseau et al. |
| 2015/0060064 A1 | 3/2015 | Lafferty et al. |

OTHER PUBLICATIONS

International Search Report and Written Opinion issued in PCT/US2016/065219 dated Mar. 20, 2017; 12 pages.

Office Action issued in Chinese Patent Application No. 201480063336.0 dated Jul. 25, 2018; 12 pages (with English Translation).

CERAMIC PARTICLES FORMED FROM PERFORATED MEMBRANES

RELATED APPLICATION INFORMATION

This application is a national phase of International Patent Application No. PCT/US2014/065587 filed Nov. 14, 2014, which claims the benefit of U.S. Provisional Application No. 61/905943 filed November 19, 2013, both of which are incorporated herein in their entirety.

FIELD

The field to which the disclosure generally relates to proppant particles formed by emitting a slurry from a perforated membrane to produce divided particles from slurry bodies, along with methods of use of the particles, and compositions of slurries forming the particles.

BACKGROUND

The statements in this section merely provide background information related to the present disclosure and may not constitute prior art.

Hydraulic fracturing is a process of pumping liquids down a well and into a subterranean formation at high rate and pressure, such that a fracture is formed in the rock around the well. After pumping a liquid volume sufficient to widen the fracture adequately, solid particles, called "proppant," are added to the liquid. After pumping is completed, the well is opened for production of hydrocarbons. The production rate and production service of fluid from the well is usually significantly increased after the fracturing treatment. Vast improvements in the hydraulic fracturing process have been developed since the process was originally patented in 1949. See US2013/0025862, the disclosure of which is included in its entirety herein, by reference.

The material first used for proppant in hydraulic fracturing of wells was silica sand. As wells became deeper, sand was sometimes found to have inadequate strength or other properties. In deep wells, stress of the earth can cause the sand to crush and become much less effective in increasing the production rate of a well.

Synthetic proppant materials were developed to provide higher strength proppants. One type of synthetic sintered proppant was sintered bauxite. In later years, a variety of ceramic raw materials have been used to make sintered ceramic proppants, including bauxite containing alumina and clay minerals, such as kaolin. However, there remains a continuing need to develop and supply synthetic proppants with select properties for placement in subterranean formation fractures with improved stress resistance and distribution, such need met at least in part, by the following disclosure.

SUMMARY

This section provides a general summary of the disclosure, and is not a necessarily a comprehensive disclosure of its full scope or all of its features.

In a first aspect of the disclosure, a method is provided which includes providing an aqueous slurry of ceramic forming raw materials, flowing the slurry through a perforated membrane to form slurry bodies, receiving the slurry bodies in a collecting hopper, and drying the slurry bodies to form particles. In some cases, the slurry is energized as it flows through the perforated membrane.

In another aspect of the disclosure, methods include providing an aqueous slurry of ceramic forming raw materials, the slurry further including a reactant and a dispersant, flowing the slurry through a perforated membrane while energizing the slurry to form slurry bodies, passing the slurry bodies through a mist in a chamber, where the mist includes a coagulation agent which reacts with the reactant in the slurry bodies, then receiving the slurry bodies in a collecting hopper, and drying or otherwise solidifying the slurry bodies to form particles.

Another aspect includes methods of hydraulic fracturing a subterranean formation penetrated by a wellbore by pumping a fracturing fluid into the wellbore at a pressure above the fracturing stress of the formation and adding proppant particles to the fracturing fluid then delivering the proppant particles and the fluid into the wellbore. The proppant particles may be prepared by providing an aqueous slurry of ceramic forming raw materials, flowing the slurry through a perforated membrane to form slurry bodies, receiving the slurry bodies in a collecting hopper, and drying the slurry bodies to form the proppant particles.

Yet another aspect provides a system having a tank for delivering a slurry of particle forming raw materials, a perforated membrane for forming slurry bodies from the aqueous slurry, a misting chamber disposed adjacent the perforated membrane, and a collecting hopper disposed adjacent the misting chamber where the tank is fluidly connected with perforated membrane.

Some aqueous slurries used in accordance with the disclosure include a bauxite material containing less than eighty percent alumina, an optional rheology modifying agent, and an optional reactant and dispersant, where the dispersant may be a surfactant which at least partially influences slurry body shape and/or size. In some cases, the aqueous slurry may have at least one ingredient influencing the rheology properties of the slurry, such as attapulgite, by way of example. In some aspects, the aqueous slurry comprises about greater than or equal to 46% by weight alumina, about less than or equal to 18% by weight silica and about less than or equal to 10% by weight zirconia or derivatized zirconia oxides. The ceramic slurries may also contain at least one of glass, fly ash or soda ash. The slurries may also include graphite coated iron particles, graphite coated magnetic powder, polysaccharide, or any other suitable materials.

In some aspects of the disclosure, the perforated membrane may be a substantially planar surface which does not include nozzles for discharging slurry bodies. In some other aspects the collecting hopper is a bathless container, or the hopper does not include a bath for treating the slurry bodies. Also, a sintering process may be used in addition to drying, to form the particles.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
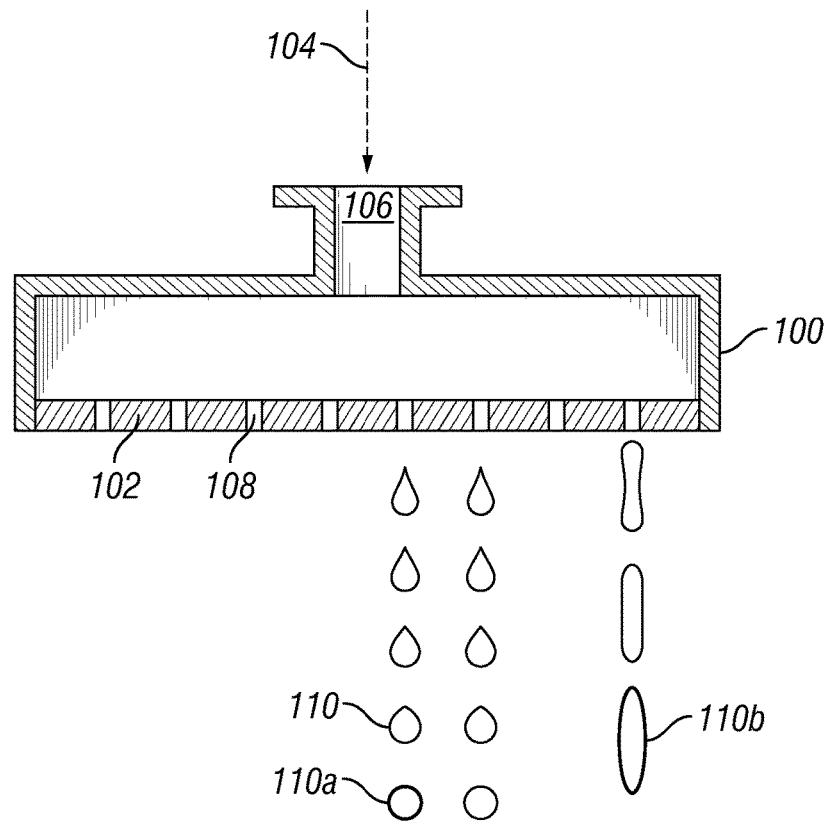
FIG. 1 illustrates a slurry body forming apparatus in accordance with an aspect of the disclosure, in a cross sectional view.
Figure 1:
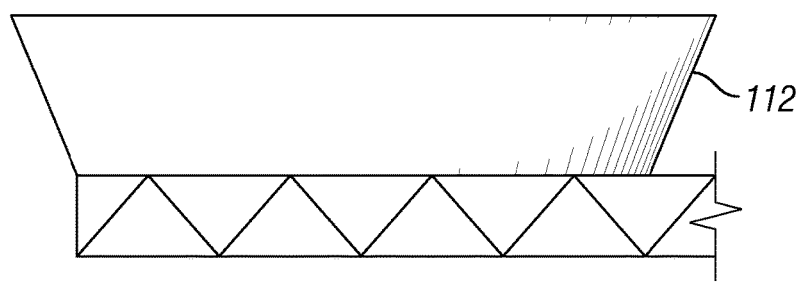

The following description of the variations is merely illustrative in nature and is in no way intended to limit the scope of the invention, its application, or uses. The description and examples are presented herein solely for the purpose of illustrating the various embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The inventors have discovered processes and compositions which provide stronger ceramic proppant, which is uniquely shaped, and of selected, narrow size distribution with at least partially uniform surfaces. Some illustrative embodiments are directed towards ceramic granules, which may be used as proppant particles. Ceramic proppant, a synthetic material, such as alumina silica or magnesia silica based, may be used in hydraulic fracturing techniques to enhance the production of wellbores formed in subterranean formations, such as those drilled, fractured and used in the production of hydrocarbon fluids. Ceramic proppants may be formed from natural or refined raw materials. They may be selected based upon their resistance to the impact of extreme physical/chemical factors, such as temperature and pressure, to distribute more readily and/or evenly through a fracture, and to enable faster and/or prolonged extraction of gas and oil from subterranean formations. Ceramic proppants may be coated or uncoated proppants based on organic, inorganic or other metal silica alloys, such as bauxites, kaolins, clays, alumina, loams, metallurgical-grade slags, phenol-formaldehyde resins, aluminum, bronze, or any of their combinations.

The ceramic proppants may be formed from a slurry of raw materials. The relative quantities of ceramic starting material, water or other solvent, optional binder, and optional dispersant, as well as other ingredients, in the slurry depend on the desired properties for the resultant solid ceramic proppant. The relative quantities starting materials may be those amounts that render the slurry suitable for pumping through the particle forming processing equipment. By nonlimiting example, the slurry may have a solids content of from about 50% by weight to about 90% by weight, from about 60% by weight to about 88% by weight, from about 70% by weight to about 80% by weight, from about 50 to about 60% by weight, or even from about 60% to about 70% by weight. The slurry may further contain additives to maintain the slurry at a constant and stable pH-value, such as in a range of about 7 to about 10 with a variation of about +/−2, about +/−1, about +/−0.5, or even a variation of about +/−0.2.

Some ceramic proppant particles prepared by embodiments of the disclosure may any can have any suitable particle size distribution, with single or multiple modal particle size distributions. For example, the proppant can have a particle size distribution, $d_{fs}$, from about 0.5 to about 5.0, wherein, $d_{fs}=\{(d_{f90}-d_{f10})/d_{f50}\}$ wherein $d_{f10}$ is a particle size wherein 10% of the particles have a smaller particle size, $d_{f50}$ is a median particle size wherein 50% of the particles have a smaller particle size, and $d_{f90}$ is a particle size wherein 90% of the particles have a smaller particle size. The proppant may have a particle size distribution, $d_{fs}$, of from about 0.5 to about 1.5, from 0.5 to 5, from 0.5 to 4.5, from 0.5 to 4, from 0.5 to 3.5, from 0.5 to 3, from 0.5 to 2.5, from 0.5 to 2, from 0,5 to 1.5, from 0.5 to 1, from 0.75 to 5, from 0.75 to 2.5, from 0.75 to 2, and any various combinations of ranges provided herein.

The median particle size, $d_{f50}$, of the proppant can be from about 0.01 μm to 50 μm from about 0.2 μm to about 5 μm, from 0.01 μm to 50 μm, from 0.01 μm to 40 μm, from 0.01 μm to 30 μm, from 0.01 μm to 20 μm, from 0.01 μm to 10 μm, from 0.01 μm to 5 μm, from 0.05 μm to 50 μm, from 0.1 pm to 50 μm, from 1 μm to 50 μm, from 0.1 μm to 25 μm, from 0.1 μm to 10 μm, (or any points between these ranges), or any various combinations of ranges herein, wherein $d_{f50}$ is a median particle size where 50% of the particles of the distribution have a smaller particle size. In some aspects, the proppant has a particle size in a range of $d_{f50}$ from 0.7 to 7.0 μm and a $d_{f98}$ from 3.5 to 35 μm with a content of submicron particles of less than 1 μm of from about 8 to about 80%.

In some illustrative embodiments, a slurry is prepared which contains water and a ceramic starting material having an alumina content of greater than about 10 weight percent. The slurry is prepared by blending, mixing, agitating or similar means known to those of ordinary skill in the art. The ceramic starting material may be an uncalcined ceramic material, partially calcined ceramic material, calcined ceramic material, or combinations thereof. In some embodiments, the ceramic starting material is a material from which a solid ceramic particle that is substantially round and spherical can be made, and which may contain naturally-occurring volatiles (which volatiles may include moisture, organics and chemically bound water [also referred to as "water of hydration"]). In some aspects, the amount of naturally-occurring volatiles is from about 10 to about 40 weight percent of the ceramic starting material. The ceramic starting material may be an uncalcined clay, partially calcined clay, calcined clay, or mixtures thereof. In still other embodiments, the ceramic starting material is a kaolin clay, bauxitic clay, bauxite, magnesium oxide, any of which may be calcined, partially calcined, or uncalcined, and mixtures thereof. In some cases, the ceramic starting material contains bauxite having an alumina content less than about 85 percent and a size and strength appropriate for use as a proppant, where an appropriate strength of the proppant particles may be defined as a decrease of less than seventy percent of long-term water permeability (as measured in accordance with ISO 13503-5 at 250 degrees F., for a pack of test particles in the size range of 20-40 mesh, where a stress applied to the pack of test particles increases from 2,000 psi to 14,000 psi).

The slurry may further include a reactant chemical, such as polyvinyl alcohol, polyvinyl acetate, methylcellulose, dextrin, sodium alginate and molasses. Reactant chemicals are typically organic materials used to increase particle strength and shape integrity. In some embodiments, water can act as a reactant. One useful reactant chemical is sodium alginate. This is a naturally occurring polysaccharide that is soluble in water as the sodium salt and may be cross-linked to form a gel as the calcium salt. Alginate is typically added to the slurry at levels of from about 0.1% to about 2% (weight percent alginate solid relative total slurry weight). After slurry body formation, a coagulation liquid which gels the reactant chemical may be applied to the slurry body. Some examples of useful coagulation liquids for sodium alginate include, but are not limited to, a calcium chloride solution at suitable concentration of calcium chloride, or an aluminum chloride hexahydrate solution. A variety of other reactants in the slurry forming the slurry bodies may be used. This may include other polysaccharides and other cross-linking compounds such as polyvinyl alcohol or borate fluids.

In some aspects of the disclosure, the slurry may further include a suitable dispersant, such as, but not limited to, at least one of a colloid, polyelectrolyte, tetra sodium pyrophosphate, tetra potassium pyrophosphate, polyphosphate, ammonium citrate, ferric ammonium citrate, hexametaphosphate, sodium silicate, ammonium polyacrylate, sodium polymethacrylate, sodium citrate, sodium polysulfonate or hexametaphosphate salt. Dispersants may be included to enhance the total solids content of the slurry by reducing, or optimizing, the slurry viscosity and other rheology characteristics. The amount of dispersant to be used in a slurry may be balanced between the ability to atomize the slurry into suitable sized slurry bodies, and the ability to make solid, spherical particles. Optimization of the dispersant type and concentration can reduce viscosity. Dispersants may be selected based on cost, availability and effectiveness in optimizing viscosity of a selected slurry. In those illustrative embodiments where the slurry comprises a dispersant, the amount of dispersant can be any suitable amount, such as for example, less than about 0.3 percent by weight of the dry ceramic starting material, less than about 0.5 percent by weight of the dry ceramic starting material, or even less than about 2 percent, by weight of the dry ceramic starting material.

In some embodiments, the rheological properties of the slurry used to form the ceramic proppant are tailored with suitable additives to achieve optimum rheological characteristics, such as thixotropy, pseudoplasticity, and stress/strain viscosity relationship. Some useful examples of the additives include those which influence the zeta potential of substrate particles. In some other embodiments, the slurry contains at least an attapulgite additive influencing the thixotropic behavior of the fluid.

In one nonlimiting example of a suitable ceramic slurry, the slurry contains at least 46% by weight alumina ($Al_2O_3$), at least 18% by weight silica ($SiO_2$) and a maximum of 10% by weight of zirconia ($ZrO_2$) or its derivatized oxides, but not necessarily excluding any other mineral. Substrates from the recycling industry, including, but not limited to glass, flyash, soda ash, and the like, may also be incorporated. In some cases, the slurry formulation may contain a portion of graphite coated iron particles. The graphite may prevent the iron particles from melting and dissolving in the formulation, thus increasing the probability of maintaining detectable iron particles in the proppant. This may enable the proppant to be detected by a magnetic field. The slurry formulation may contain a portion of graphite coated magnetic powder. The graphite having the same function than under that immediately above. The magnetic powder may include one or multiple materials with different magnetic field strength, enabling the proppant manufacturer of giving a specific code to each proppant.

Some illustrative embodiments of the disclosure relate to methods for preparing ceramic proppant particles. In such embodiments, a slurry suspending or solvating ceramic forming raw materials is provided to a drop tower apparatus including a perforated membrane to form droplets, needles, noodles, or other slurry bodies, which then ultimately form ceramic particles useful as proppant particles. The perforated membrane may be a slurry body forming membrane having one or more perforations therein that receives slurry from feed tank or other suitable source which may contain ceramic forming raw materials suspended or dissolved in water. Pressure can be applied to feed tank by a pressure supply system, or a pump integrated with the supply system, which causes the slurry to flow through at least one perforation at a selected rate, and optionally in laminar flow. Below the bottom surface of the perforated membrane may be a collection hopper, and an optional chamber may be disposed there between. The chamber may be used to at least partially cure the slurry bodies, and the vessel may receive the slurry bodies.

As shown in FIG. 1, which illustrates a slurry body forming embodiment of the disclosure in a cross sectional view, housing 100 is provided to support a perforated membrane 102 and to receive slurry delivery to housing 100 at point 104, and fed through perforated membrane 102. Slurry may be delivered to housing 100 through an opening 106, or multiple openings disposed on housing 100 (not shown). Slurry may then be emitted, or otherwise discharged, from perforations 108 (eight shown) forming slurry bodies 110 (thirteen shown). Depending on slurry rheology, or even other suitable properties and conditions, either substantially spherical droplets 110a, cylindrical noodles 110b or other resulting output shaped slurry bodies, may be formed and can fall by gravity, mist and/or air transportation, vertically or horizontally into a collecting hopper 112. Such conditions and properties forming slurry body shapes are within the scope of this disclosure. The slurry bodies 112 may also be extruded from the membrane 102. In some aspects of the disclosure, use of a perforated membrane 102 provides the benefit emitting slurry from perforation(s)108 which is/are at least substantially free of accumulation of slurry on the perimeter of the perforation(s) 108, or otherwise obstructing free emission of slurry from perforation(s) 108. Such benefit is in contrast with slurry accumulation issues which may arise with use of plate mounted projected spouts (or nozzles) through which slurry is discharged. In some embodiments of the disclosure, perforation(s) 108 terminate at the outer surface of the membrane, and as such, are substantially flush therewith.

Figure 2:
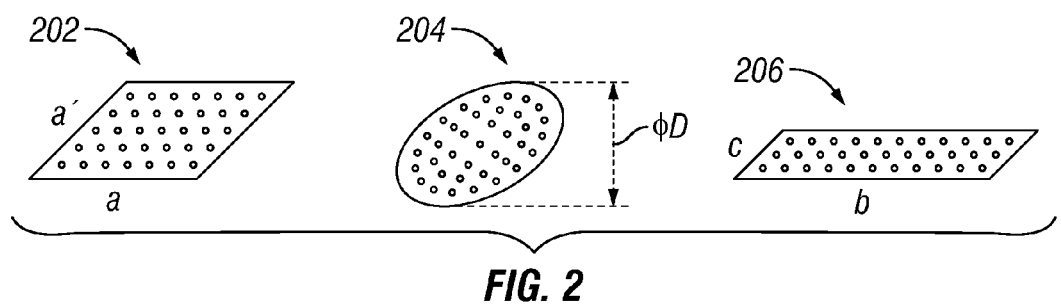
FIG. 2 depicts some examples of perforated membrane shapes in accordance with the disclosure, in a perspective view.

Now referring to FIG. 2, which depicts some examples, although not limited thereto, of perforated membrane shapes useful in embodiments. Perforated membrane outer perimeter shapes may include circular 202 (where the diameter around the circumference is essentially equal), square 204 (where a and a' are substantially equal), rectangular 206 (where b and c are unequal), or any other suitable shape for forming slurry bodies. In some embodiments, the slurry bodies may be further processed to form particles, such as ceramic proppant particles, which may have an average particle size of from less than about 0.025 mm to about 2.5 mm or more, or in some instances, a size from between about 50 to about 1500 microns, but not limited thereto. Perforations through the membrane may be of any suitable dimension, diameter or length, to produce particles of particular particle size(s). For example, it has been found in some cases that cylindrical passageways through the membrane having a diameter of about 0.3 mm produce particles from about 0.7 mm to about 0.9 mm in particle size, and about 0.3 mm, and those with a diameter of about 0.5 mm may produce particles from about 1.1 mm to about 1.5 mm in particle size.

Figure 3:
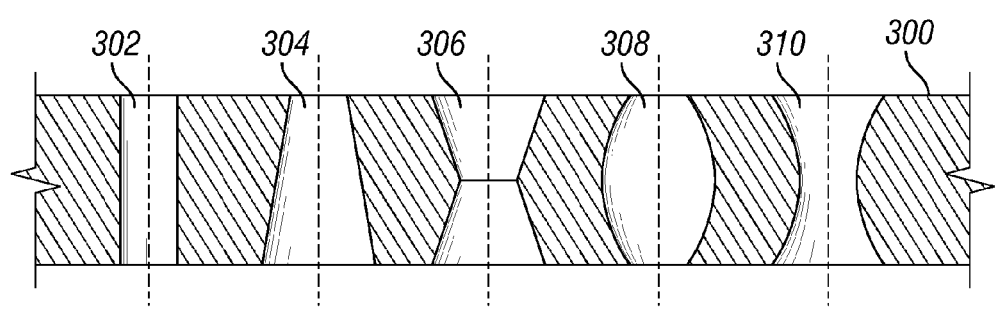
FIG. 3 illustrates some passageway shapes through perforated membranes in accordance with some aspects of the disclosure, in a cross sectional view.

With reference to FIG. 3, illustrating some passageway shapes through perforated membranes, in some cases, perforations in the membrane may be shaped to achieve optimum flow properties, and can include cylindrical, conical, double-conical or with rounded walls, but not necessarily limited thereto. For example, as shown in FIG. 3, which depicts perforation shapes in a cross-sectional view, the perforations through the membrane 300 may be cylindrical 302, conical 304, hourglass 306, concave 308, convex 310, or any other suitable shape, or combination thereof, all of which are within the spirit and scope of the disclosure.

In some embodiments, a vibrating, oscillating or other suitable energizing unit may be connected to the perforated membrane (such as 102 in FIG. 1) and may be used to supply pressure pulses to the membrane and/or in the slurry flowing through the perforations in the membrane. The resulting vibration of the slurry flow through the membrane may further enable the slurry stream exiting the perforation(s) to break into slurry bodies 110 of desired size(s) and shape (s). In some embodiments, as slurry bodies fall toward collection hopper 112, surface tension effects may tend to form the slurry bodies into spheres or other select shapes.

Figure 4:
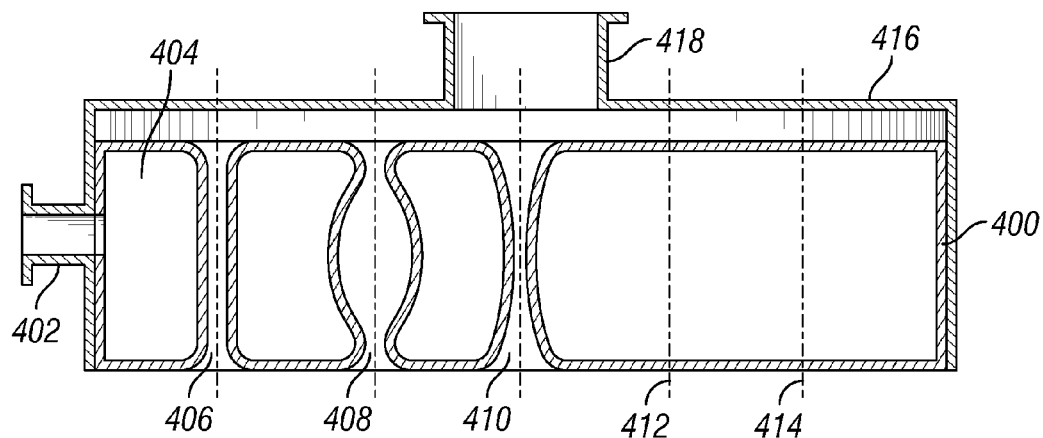
FIG. 4 shows squeezing or retracting of perforations in a membrane under varied pressure conditions, according to the disclosure, in a cross sectional view.

According to some aspects of the disclosure, the perforations may be of variable shape formed due to the material of the membrane being of a flexible material, such as polyurethane, polyester, polyethylene terephthalate (PET), polyethylene, polyvinyl chloride, polyvinylidene chloride, polypropylene, polystyrene, polyamides, acrylonitrile butadiene styrene, polystyrene, and the like, but not necessarily limited thereto. Such a flexible wall of a perforation may, in some cases, be surrounded by a pressurized and pulsed liquid, with either positive or negative pressure. The pressure may be constant, vary, or even oscillate positive to negative, or any combination thereof, while energizing the membrane and/or slurry passing through the membrane. Non-limiting examples of pressure effects to form slurry bodies include squeezing or retracting the perforation or pulsing between both stages. To illustrate, in FIG. 4, pressurized medium, such as gas or liquid is introduced into perforated membrane 400 at port 402, and fills a cavity, or chamber 404 surrounding perforations 406 408 410. If the pressure is oscillated from positive to negative, the perforation may have the shape shown in perforation 406, when negative, the shape shown in perforation 408, and when positive, the shape of perforation 410. The same concept may be applied to a plurality of perforations, which may be distributed about the membrane, for example at axis 412 and 414. Slurry forming the slurry bodies may be introduced into housing 416 through port 418. Further, in some aspects of the disclosure, an effect of energizing the membrane 400 may also provide cleaning of the membrane and perforations, thus remaining operable and avoiding or eliminating obstructions at the perforation(s) exits.

Figure 5:
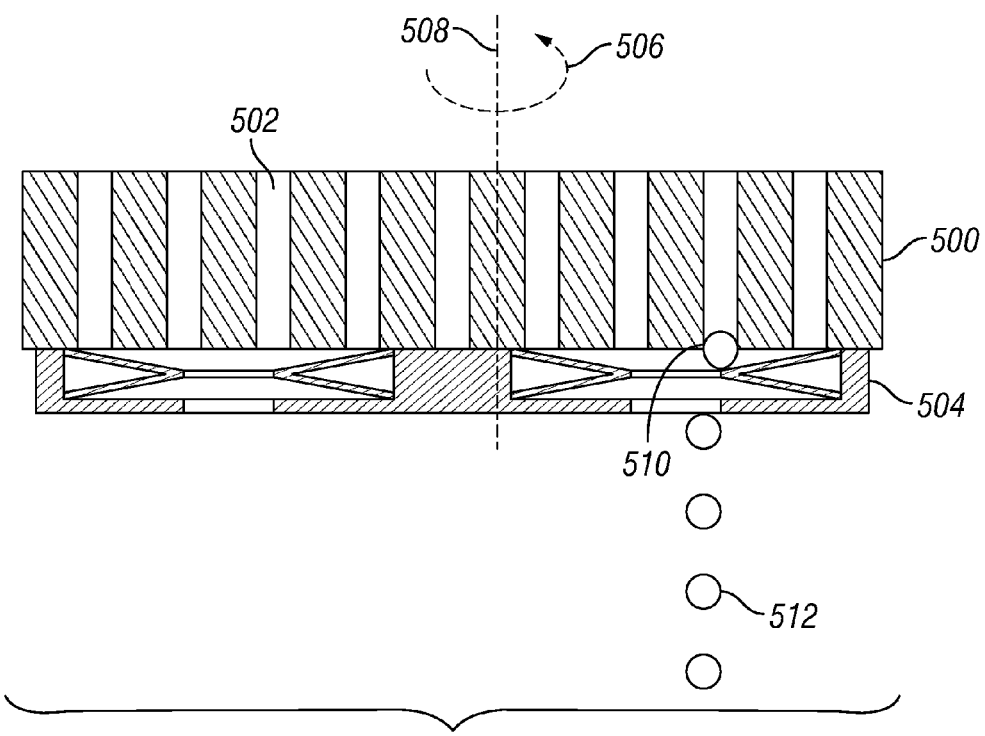
FIG. 5 depicts a perforated membrane including one or more of a rotating disc, knife, cable or other apparatus, according to the disclosure, in a cross sectional view.
Figure 6:
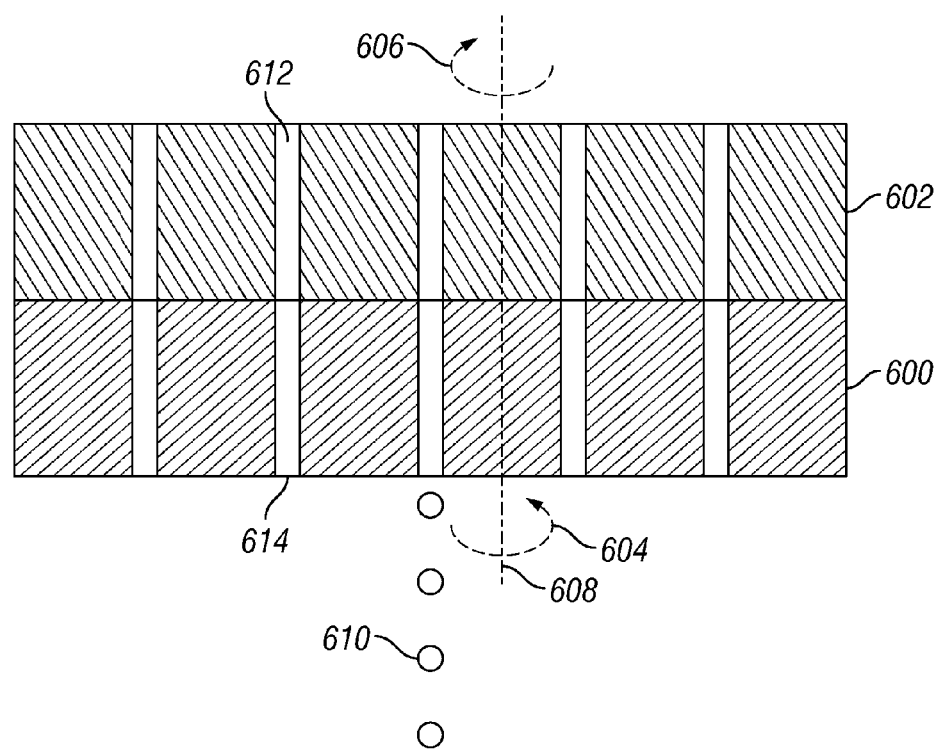
FIG. 6 illustrates rotating perforated membrane(s) in accordance with some aspects of the disclosure, in a cross sectional view.

In some other aspects of the disclosure, as illustrated in FIG. 5, the perforated membrane may include one or more of a rotating disc, knife, cable or other apparatus, to create the pulsed pressure so the droplets, noodles or other type of slurry bodies emitting from the perforations are formed at a constant and/or targeted size. This may also serve to assist the shaped ceramic slurry to release from the membrane perforation and slurry. Perforated membrane 500 supported in a housing (not shown) and includes perforations 502 (nine shown) and a rotatable device 504, arranged to rotate in a direction 506 around axis 508. Slurry may be introduced into the perforations 502, pass there through, and emit from the perforations as a bead 510. Slurry bead 510 may make contact with rotatable device 504 and release as slurry body 512 (four shown). Referring now to FIG. 6, in yet other aspects, a perforated membrane 600 may itself rotate, either against a fixed other perforated membrane 602, or both perforation membranes 600 602 rotating in counter directions 604 606 around axis 608. In some aspects, rotating perforated membrane 600, or both membranes 600 602 may enable pulsed dosification for slurry body forming droplets, noodles, etc., 610 (four shown), and a slurry is introduced into perforations 612 (five shown), passing there through in into and through perforations 614 (five shown), then emitting as slurry bodies 610.

Figure 7:
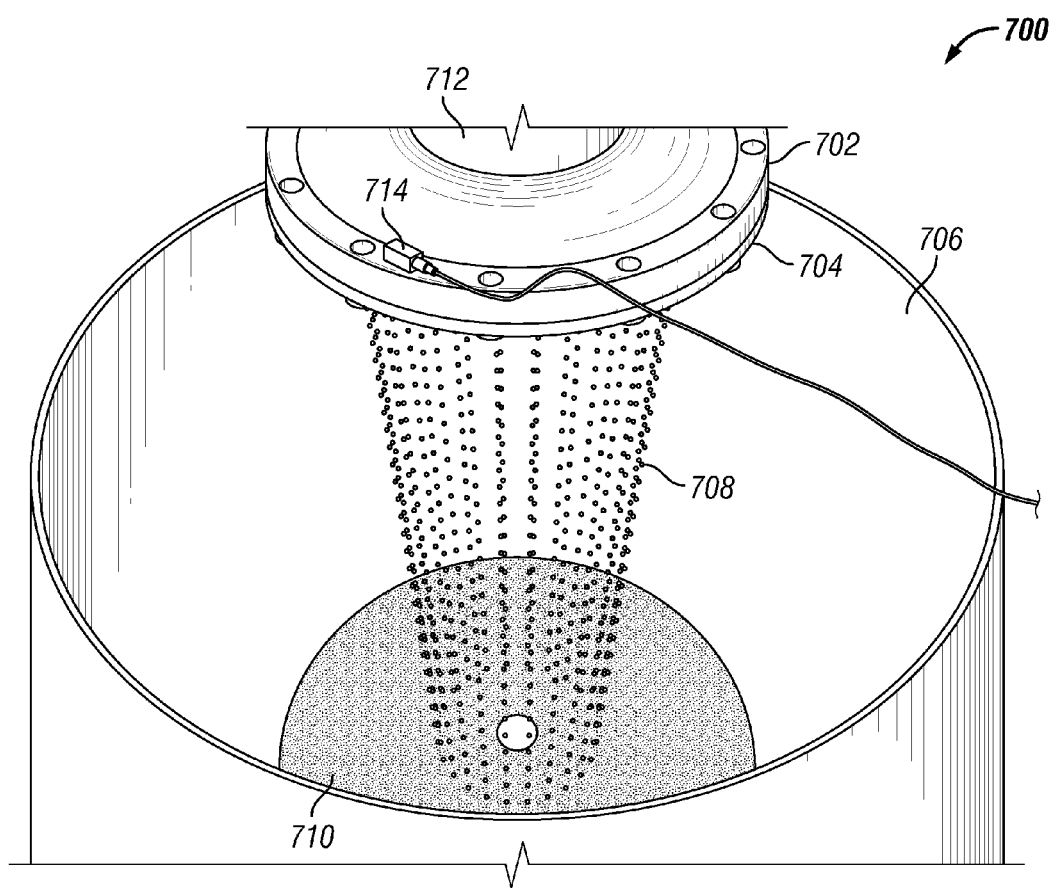
FIG. 7 depicts one embodiment of a drop tower arrangement, according to the disclosure, in a perspective view.
Figure 8:
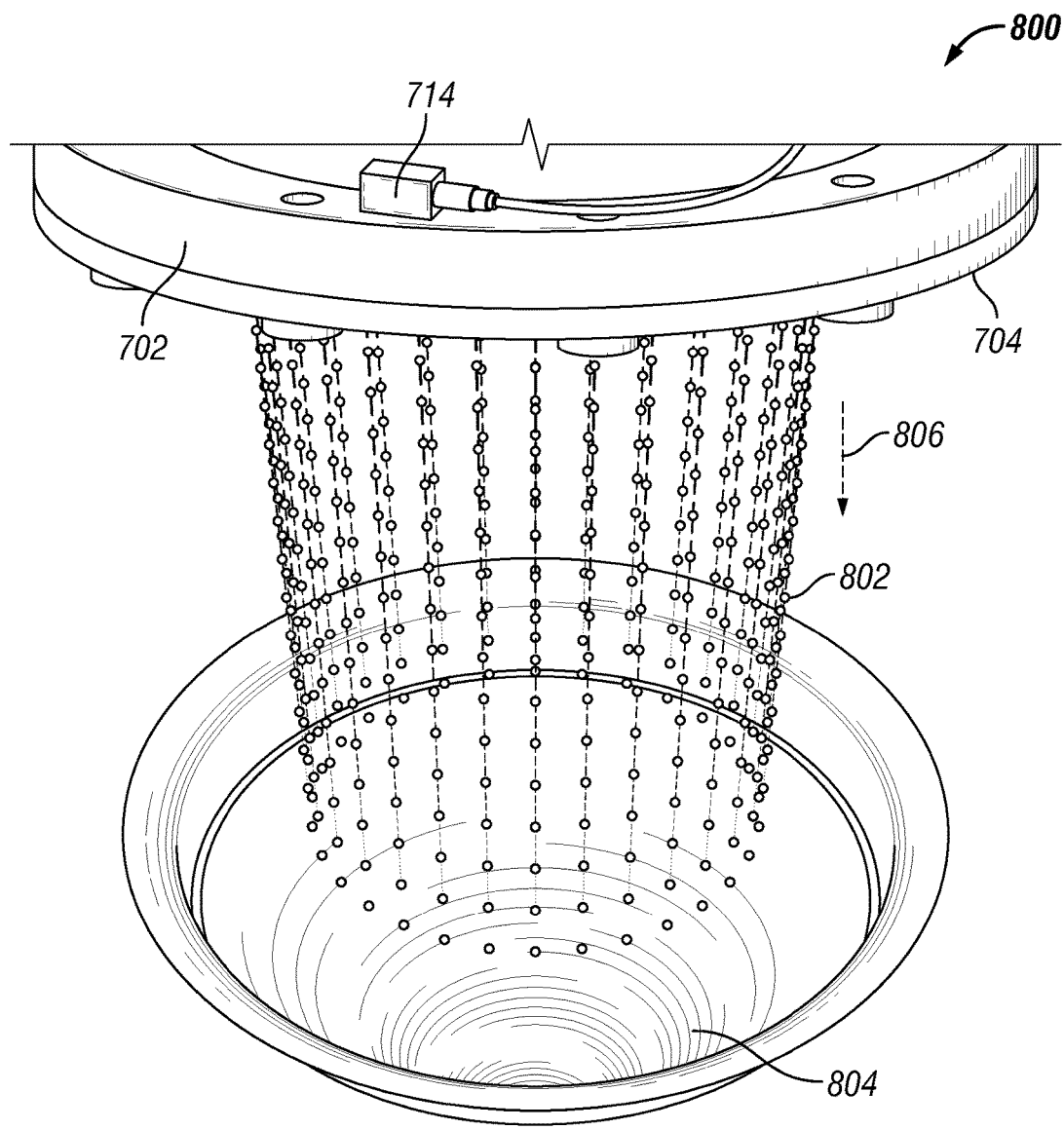
FIG. 8, illustrates a chamber shape, according to the disclosure, in a perspective view.
Figure 9:
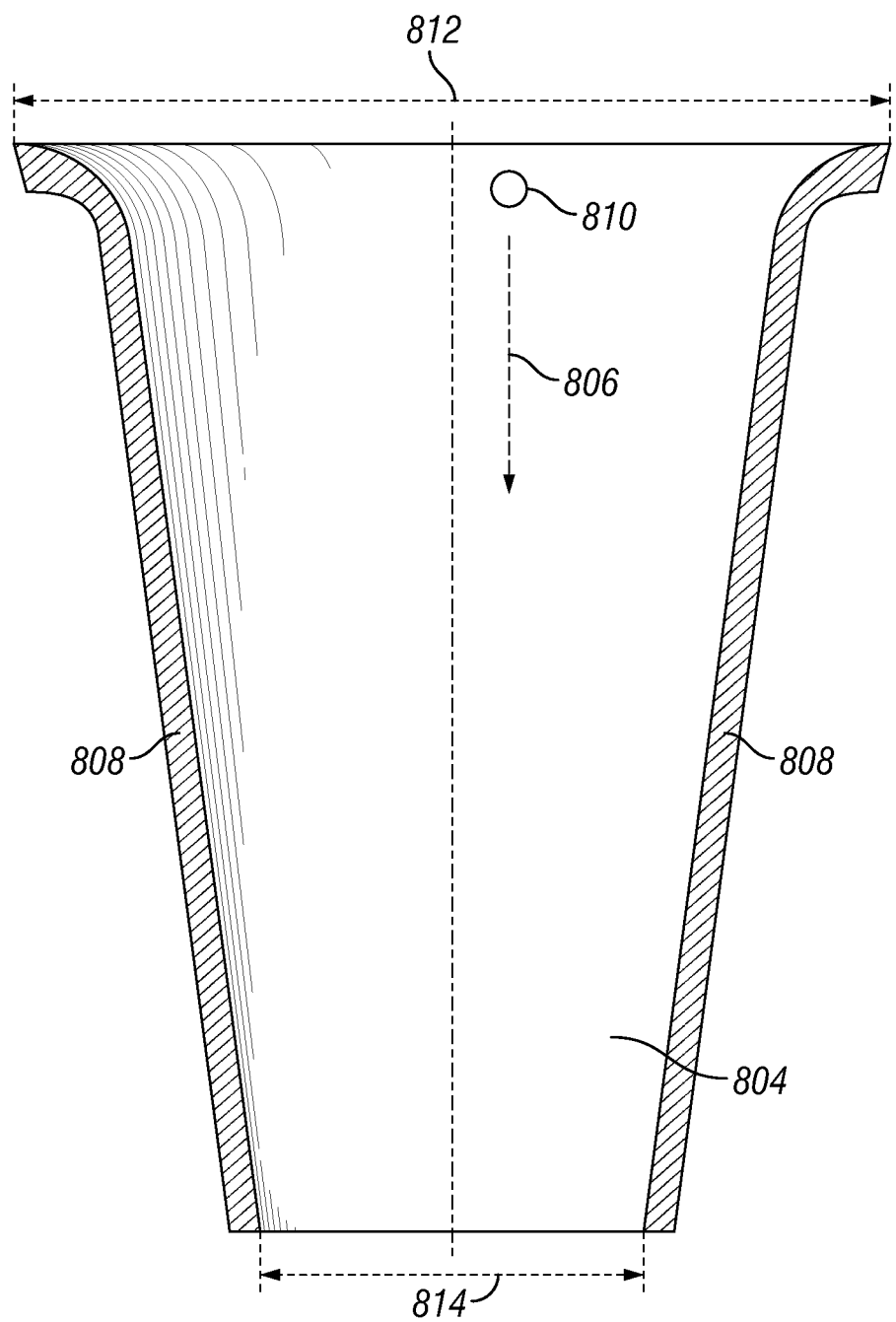
FIG. 9 depicts in a conical chamber shape in accordance with the disclosure, in a cross sectional view.

FIG. 7 depicts one embodiment of a drop tower arrangement, according to the disclosure, in a perspective view, for producing slurry bodies. The arrangement 700 includes housing 702 to secure perforated membrane 704 and form sealed passageways for accepting slurry into housing 702 and emitting slurry bodies from membrane 704. The arrangement 700 further includes a chamber 706 for containing slurry bodies 708 emitted from perforated membrane 704, and in some aspects, may further include an optional system for delivering a mist or gas containing a coagulant agent for at least partially curing the slurry bodies 708. Slurry bodies may travel through chamber 706 and be received by a collection hopper position at a distal end 710 of chamber 706. Slurry may be introduced into the arrangement at position 712, or in other embodiments, at several points of the housing (as illustrated in FIG. 11 and described in further detail below). Arrangement 700 may further include one or more pressure transducer system 714, for monitoring and controlling pressure of the slurry while passing through housing 702 and perforated membrane 704. While in FIG. 7, chamber 706 is depicted as substantially conical in shape, formed within a substantially cylindrical enclosure. However, any suitable shape and dimensions may be used which are effective in containing slurry bodies 708.

In some aspects of the disclosure, collection hopper 710 contains, leads to, or is otherwise in communication with a bath for receiving the slurry bodies, or particles formed from slurry bodies. Particles and/or slurry bodies entering the bath may submerge therein and settle deeper into, or even to the bottom of, the bath, and be subsequently processed to form a final product. In yet other aspects, the surface of the bath may have a layer of foam formed and/or disposed thereupon for further helping maintain the integrity of the slurry body and/or particle shape during the collection process. The foam may be generated by any suitable technique. In some cases, compressed air is applied to the surface of the bath to form a cushioning foam layer to avoid or minimize deformation of shape of the particles and/or slurry bodies, when received by the bath.

With reference to FIG. 8, which illustrates another chamber shape useful in some embodiments of the disclosure, arrangement 800 includes a housing, perforated membrane, optional pressure transducer (such as 702, 704 and 714), as well as an optional system for delivering a mist or gas containing a coagulant agent for at least partially curing the slurry bodies 802, as they discharge from perforated membrane 704. Slurry bodies 802 travel through chamber 804 after discharging perforated membrane 704, chamber 804 being substantially conical and defined within a cone shaped enclosure. A conical shaped chamber 804 may, in some cases, be effective to achieve a targeted velocity, or variation in velocity, of slurry bodies 802 while passing through the chamber in direction 806. FIG. 9 depicts in a cross-section view, chamber 804 formed within enclosure 808. As shown in FIG. 9, slurry body(s) 810 moves through chamber 804 in direction 806 from an inlet portion of chamber 804 with diameter 812, to a discharge portion with diameter 814. Use of different diameter inlet and discharge portions may, in some cases, change the velocity of the slurry bodies while moving through the chamber. For example, a discharge with smaller diameter than the inlet may decrease the velocity, or otherwise decelerate, thereby resulting in increased residence time within the chamber.

Now referencing FIG. 10, which illustrates, in a perspective view, a chamber (such as those depicted in FIGS. 7 through 9) shown in a plane perpendicular to axial centerline 1000 positioned on the center of and extending through the chamber 1002. Chamber 1002 is defined within enclosure 1004, and further includes a system for delivering a mist or gas containing a coagulant agent for at least partially curing slurry bodies as they travel through chamber 1002. The system for delivering the mist or gas contains nozzles 1006 in fluid communication with a fluid delivery system 1008. The nozzles 1006 deliver an agent to slurry bodies as they travel through chamber 1002 in an overall direction substantially parallel axial centerline 1000.

FIG. 11 depicts an embodiment of a slurry body forming arrangement in accordance with the disclosure where slurry is introduced at several points. The arrangement 1100 includes support 1102 connected with housing 1104 to secure perforated membrane 1106 and form sealed passageways for accepting slurry into housing 1104 and emitting slurry bodies from membrane 1106 through perforations 1108. The arrangement may is in further communication with a chamber for containing and at least partially curing the slurry bodies once emitted from perforated membrane 1106. Slurry is introduced into housing 1104, at several points disposed about the perimeter of the housing, through injectors 1110 (twelve shown). Injectors 1110 are fluidly connected with a slurry supply line 1112, which is connected with a slurry source (not shown) and suitable means for transporting the slurry from the source to the injectors 1110, according to targeted conditions. In some aspects, the slurry may be delivered under variable pressure and thus energized, while in some other aspects, housing 1104 and perforated membrane are energized. A combination of energizing the housing and perforated membrane as well variable slurry pressure or velocity is also within the spirit and scope of the disclosure.

Referring now to FIG. 12, which illustrates one embodiment of a system for preparing proppant from a ceramic slurry, in accordance with the disclosure. System 1200 includes slurry tank 1202 containing a slurry 1204 at one end of the system, and proppant storage, processing and/or discharge system 1206 for handling proppant 1208, located at an opposing end of system 1200. Slurry 1204 may include finely ground mineral or processed powder (from about 0.01 to about 50 microns in size) capable of producing a strong ceramic material after processing, a suitable amount of optional dispersant helping keep the solid particles in the slurry well separated, water, and a reactant which may optionally react with a component in a mist after slurry body formation to form an at least partially cured slurry body which is semi-solid, crystalline, semi-amorphous, amorphous, liquid, and/or essentially insoluble. In an illustrative example, The weight solids content of the slurry 1204, before passage through membrane perforations, may range from about 10% to about 90%, from about 25% to about 75%, or even from about 40% to about 60%, and the viscosity of slurry 1204 may be any point in the range from about 1 to about 1,000 centipoise at operational pressures and temperatures. In some aspects, the process utilized maintains the slurry 1204 with a suitably stable temperature, such as in a range of from about 20° C. to about 50° C. with a variation of about +/−2° C.

Figure 10:
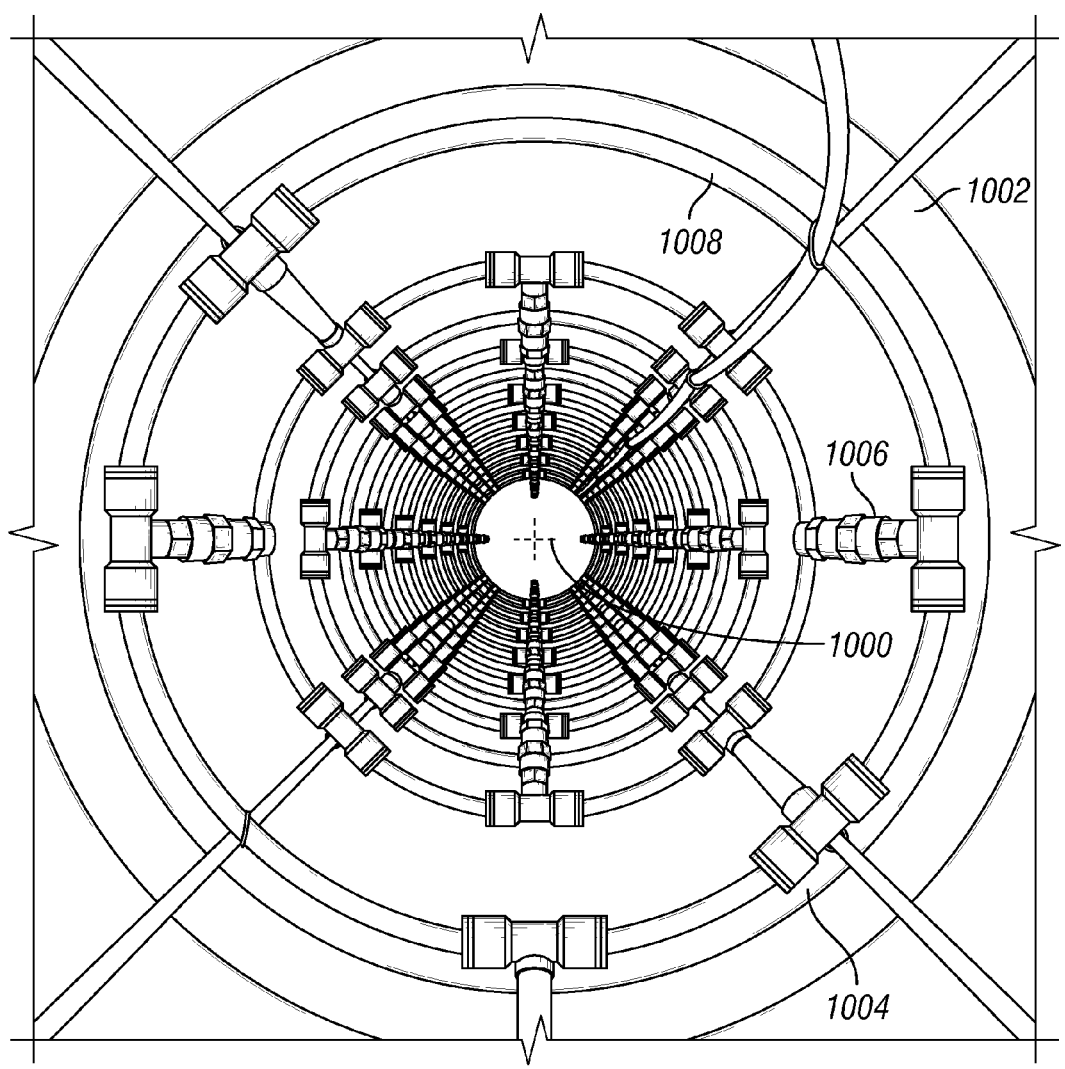
FIG. 10 illustrates, a chamber shown in a plane perpendicular to axial centerline of the chamber, according to the disclosure, in a perspective view.
Figure 11:
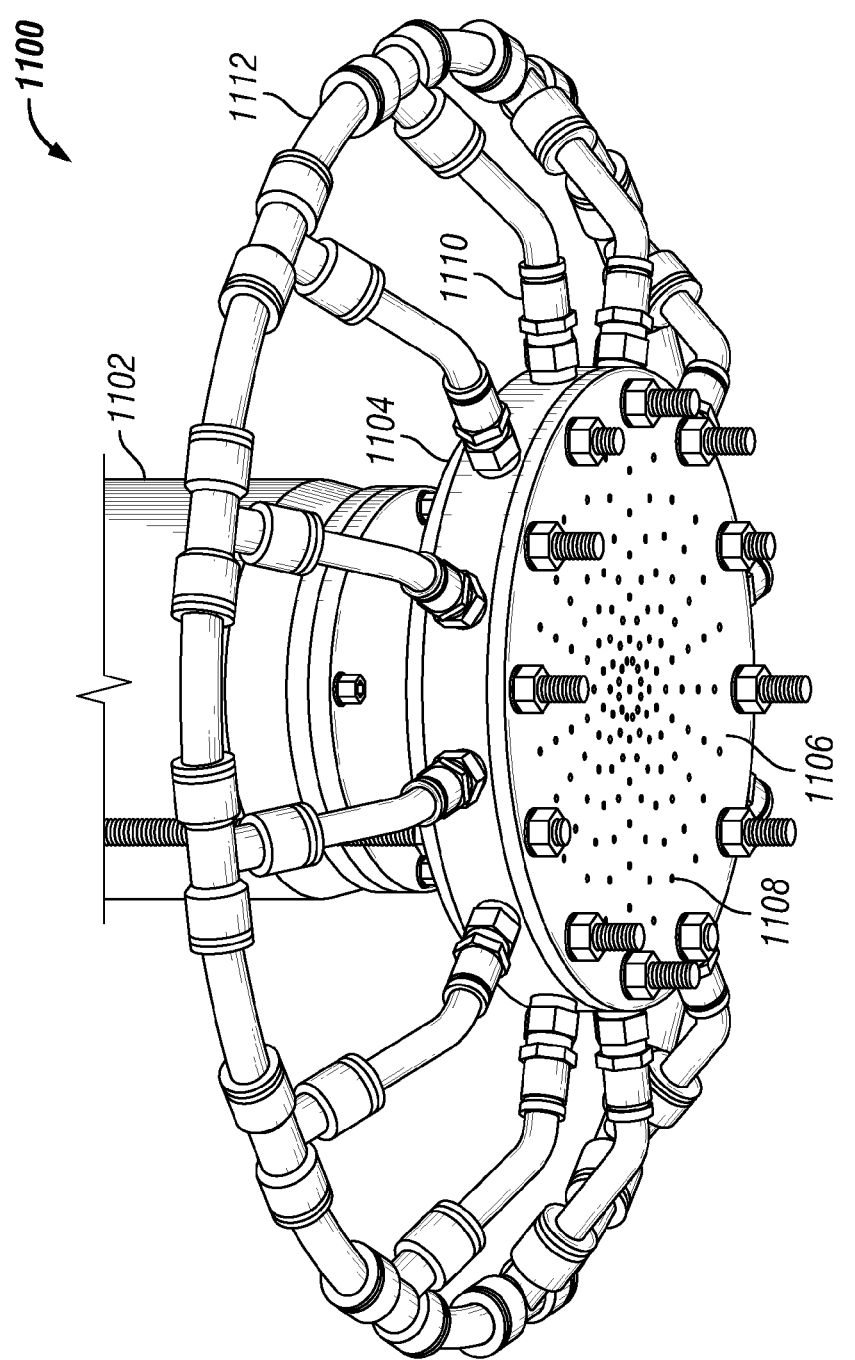
FIG. 11 depicts a slurry body forming arrangement with a plurality of slurry injection points, according to the disclosure, in a perspective view.
Figure 12:
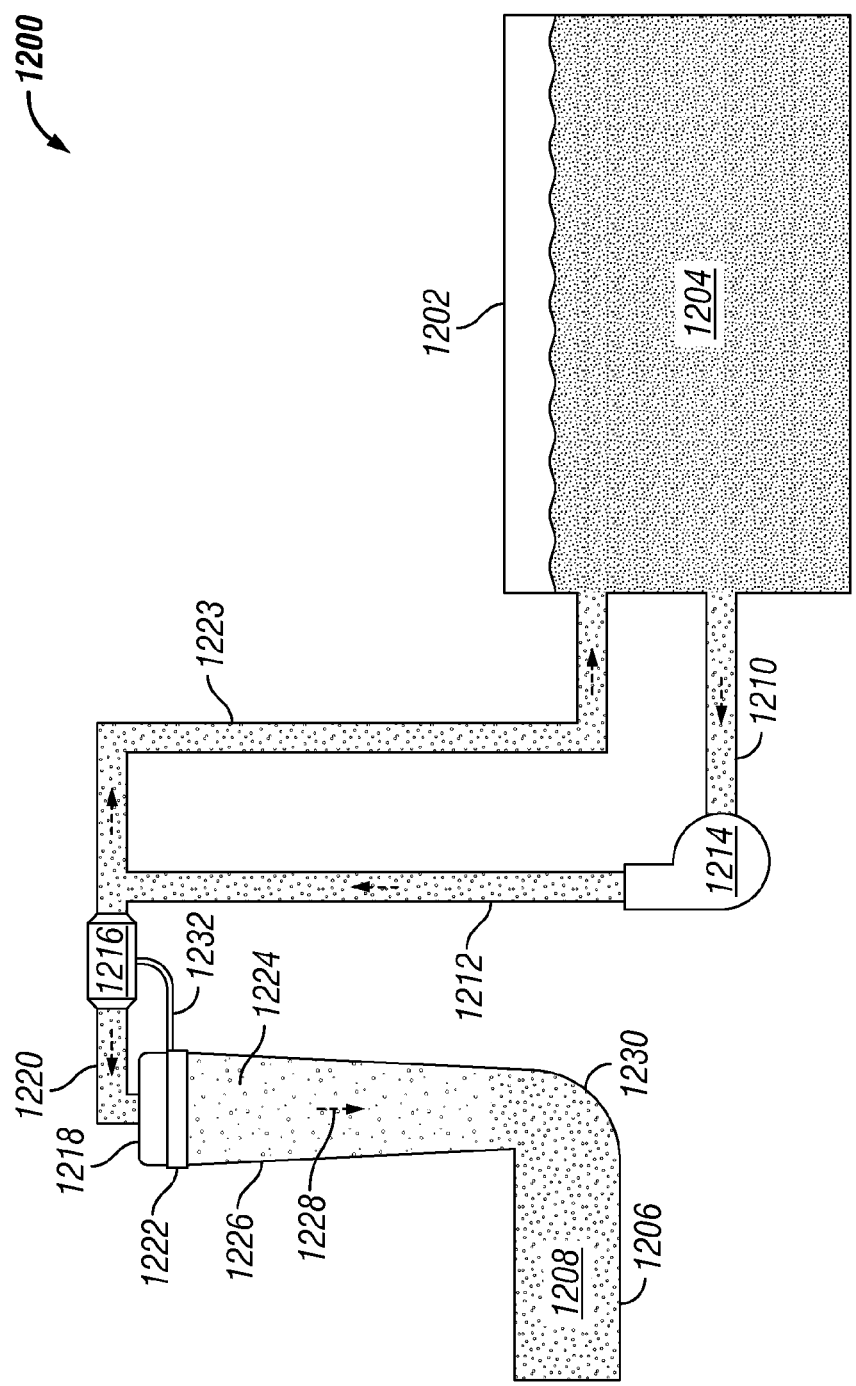
FIG. 12 illustrates one system for preparing proppant from a ceramic slurry, in accordance with the disclosure, in a plan view.

Slurry 1204 is moved through conduits 1210 and 1212 by pump 1214. While a pump 1214 is shown, slurry may also be moved through system 1200 by air pressure, or combination of both. A device 1216 regulating, or even controlling, flow rate, pressure, pressure variation, and the like, may be included in the system for manipulating delivery of slurry to housing 1218 through conduit 1220. While conduit 1220 is depicted as delivering slurry into housing 1218 through one conduit 1220, on some other aspects the slurry may be delivered into housing 1218 through multiple inlets or conduits, such as that shown in FIG. 11. Excess slurry 1204 not passing through device 1216 and into housing 1218 may be returned to slurry tank 1202 via conduit 1223. Slurry 1204 delivered to housing 1218 from conduit 1220 may then pass through perforations in perforated membrane 1222 and be emitted as slurry bodies 1224 contained within chamber 1226, and travelling through chamber 1226 in direction 1228. As slurry bodies 1224 travel through and reach a distal portion of chamber 1226, they are collected in a hopper section 1230. Prior to collection in hopper 1230, slurry bodies 1224 may be at least partially cured while resident in chamber 1226 by any suitable technique, including but not limited to self curing, dehydration, desolvating, contact with a curing agent, and the like, or any combination thereof. Chamber 1226 may be of any suitable size or shape, including conical, cylindrical, and the like, and may further contain a system for delivering a mist or gas containing a coagulant agent, such as that depicted in FIG. 10.

After collection in hopper 1230, slurry bodies 1224 may be further treated and/or conditioned to form proppant particles in the hopper 1226, the bath, storage, processing and/or discharge system 1206, or combination of both. Such treatment or conditioning techniques may include drying, sintering, and the like, techniques disclosed in U.S. Pat. Pub. No. 2012/0231981A1 and U.S. Pat. No. 8,728,991B2 (both of which are included herein in their entirety), or any combination thereof. System 1200 may further include a communication and control means 1232 linked between device 1216 and housing 1218 and/or perforated membrane 1222 for continuously or semi-continuously regulating, or controlling such properties as flow rate, pressure, pressure variation, and the like. In some aspects of the disclosure, the discharge system 1206 includes a conveyor belt at least partially submerged in a bath, which conveys particles received from hopper 1230 from the bath and into an air blown drying environment. Particles and/or slurry bodies entering the bath may submerge therein and settle deeper into, or even to the bottom of, the bath. In yet other aspects, the surface of the bath may have a layer of foam formed thereupon for further help maintain the integrity of the slurry body and/or particle shape during the collection process. As described in system 1200, or any aspect of the disclosure, the point at which a slurry body transforms into a particle is not necessarily limiting in anyway, and can occur in a mist chamber, in a collection hopper, a bath, sintering process, air drying process, or other suitable device. Also, as used in the disclosure, the terms "particle" and "slurry body" may be interchangeable in some cases, while in other aspects, refer to separate concepts where a "slurry body" is formed up discharge from a perforated membrane, and "particle" is the end product generated by the system.

Figure 13:
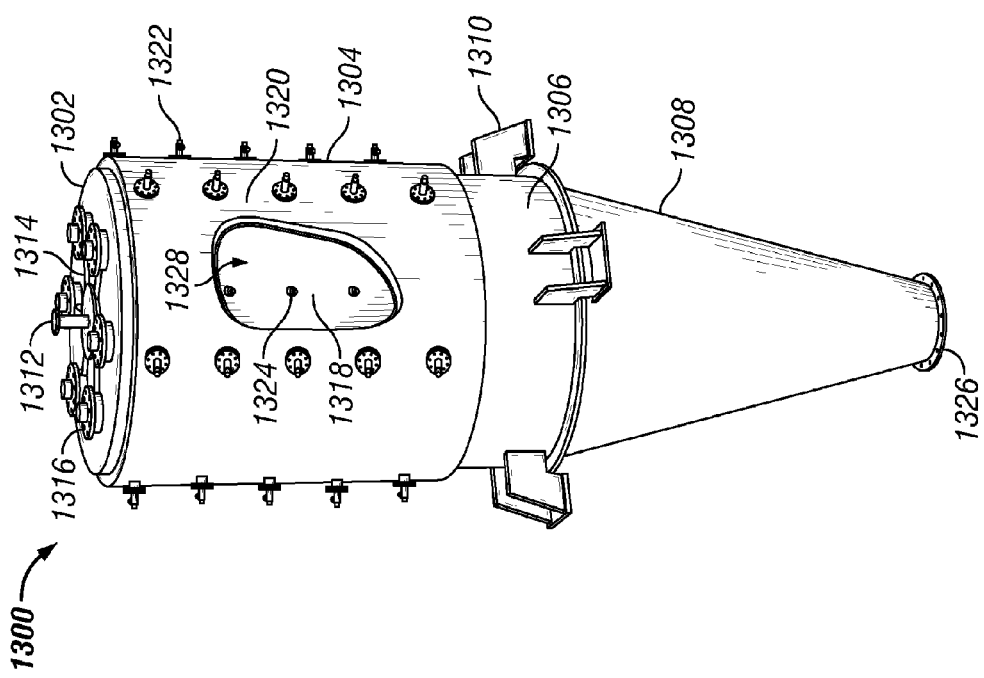

While some aspects of the disclosure described above depict use of a perforated membrane to produce slurry bodies to form particulates, it is also within the scope and spirit of the disclosure to use more than one, or a plurality of perforated membranes in as a system for generating slurry bodies. With reference to FIG. 13, which illustrates a drop tower apparatus for generating slurry bodies in a perspective view, apparatus 1300 includes an upper plate 1302, cylindrical mist housing 1304, optional intermediate housing 1306, and collection hopper 1308. Apparatus 1300 may be installed and secured in a facility, or any suitable support structure with mounts 1310 (three shown), or any other suitable mounting feature. A slurry containing particle forming materials may be introduced into the apparatus at inlet 1312, then move through a plurality of conduits 1314 (six shown), and into perforated membranes located within housings 1316 (six shown). As the slurry travels through the perforated membranes it is emitted as slurry bodies which enter mist chamber 1318 defined within mist housing 1304. Cut away 1320 is shown illustrate the interior of mist housing 1304 and chamber 1318 formed therein. A system (not shown) for delivering a mist or gas containing a coagulant agent for at least partially curing the slurry bodies is in communication with injectors 1322 (fifteen shown) disposed upon the exterior of and through the mist housing 1304. The mist or gas may be introduced into chamber 1318 through nozzles 1324 (three shown) positioned at a distal end of injectors 1322. Apparatus 1326 further includes a discharge port, or opening, 1326 at a distal end of collection hopper 1308 for then transferring particles formed in the apparatus to a particle storage, processing and/or discharge system located adjacent discharge port 1326. In operation, generally, the slurry may be introduced into apparatus 1300 at inlet 1312, then convey to perforated membranes located within housings 1316 through the plurality of conduits 1314. The perforated membranes may be energized by any suitable technique to achieve desired particle size or shape. Once emitted from the perforated membranes, slurry bodies formed from the slurry, when passed through the perforated membranes, enter mist chamber 1318 and travel in direction 1328, passing through mist chamber 1318, intermediate housing 1306, and then collection hopper 1308. Particles formed after passing through the system then may be discharged, further processed, and/or stored.

Figure 14:
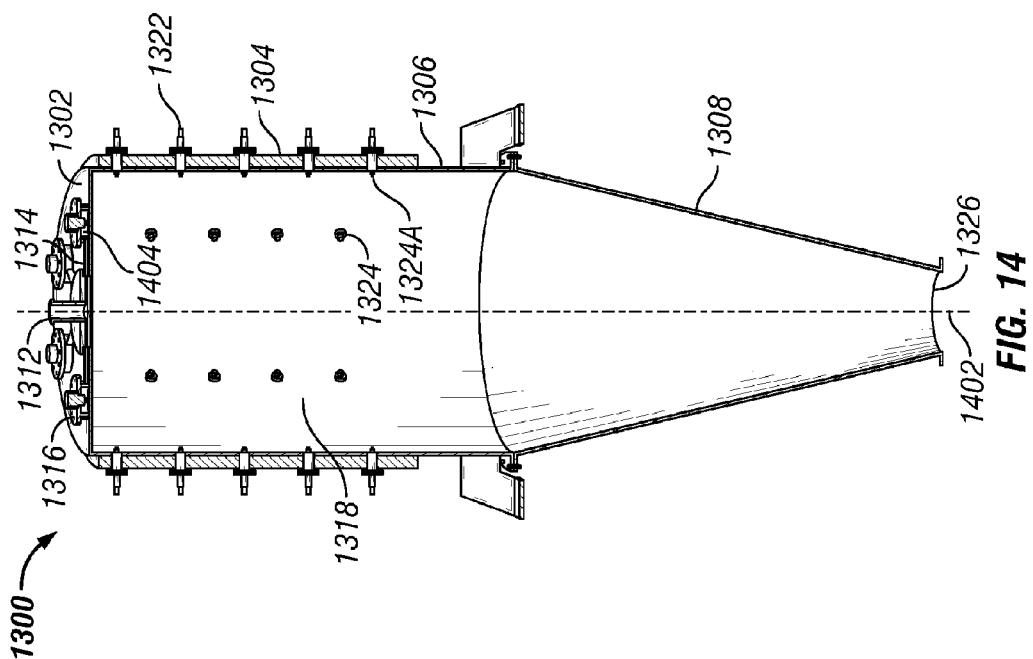
FIGS. 13 through 16 illustrate drop tower apparatus having multiple perforated membranes for generating slurry bodies, in accordance with the disclosure, in perspective views; and, FIG. 17 depicts a perforated membrane and housing arrangement with a plurality of slurry injection points, according to an aspect of the disclosure, in a perspective and cross-sectional view.
Figure 15:
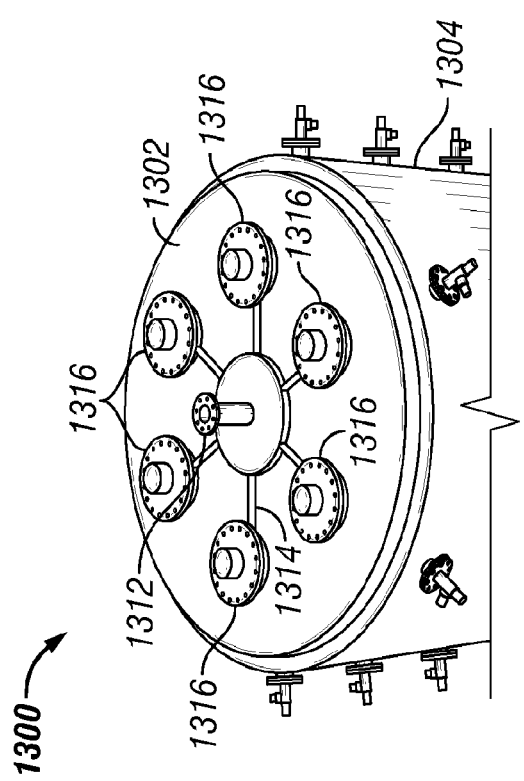

Referencing FIG. 14, which further illustrates apparatus 1300 in a perspective and cross-sectional view taken in a plane perpendicular to axial centerline 1402, in showing the interior of apparatus 1300. Perforated membranes 1404 (two shown) supported in housings 1316 are depicted in the view and are in fluid communication with chamber 1318. Nozzles 1324 (eight shown) are depicted as mounted on the inside of mist housing 1304, and nozzles 1324a (ten shown) protruding from injectors 1322 (ten shown) are illustrated in a depiction demonstrating how nozzles 1324a protrude from the inside of mist housing 1304 and into chamber 1318, to provide a mist or gas containing a coagulant agent for at least partially curing the slurry bodies as the slurry bodies move through the chamber 1318, and through the interior spaces formed within the intermediate housing 1306, and collection hopper 1308. FIG. 15 depicts the exterior top of apparatus 1300 in greater detail, in a perspective view. As shown, disposed about upper plate 1302 are housings 1316 (six shown), each containing a perforated membrane therein.

Figure 16:
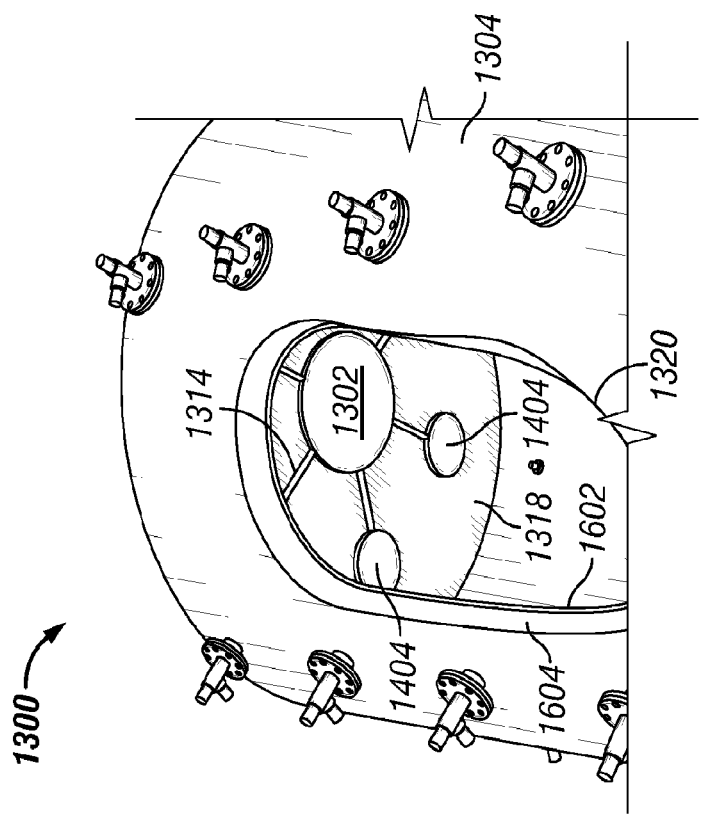

Housings 1316 are in fluid communication with inlet 1312 via conduits 1314 (six shown). FIG. 16 depicts the interior of an upper portion of apparatus 1300 in greater detail, and in a perspective view. As illustrated through cutout 1320, perforated membranes 1404 are disposed about and/or adjacent the inner portion of upper plate 1302, and are in fluid communication with inlet 1312 (not shown) via conduits 1314 (five shown). Disposed within mist housing 1304 may be another inner housing 1602, and an optional intermediate chamber 1604 may be formed there between.

Figure 17:
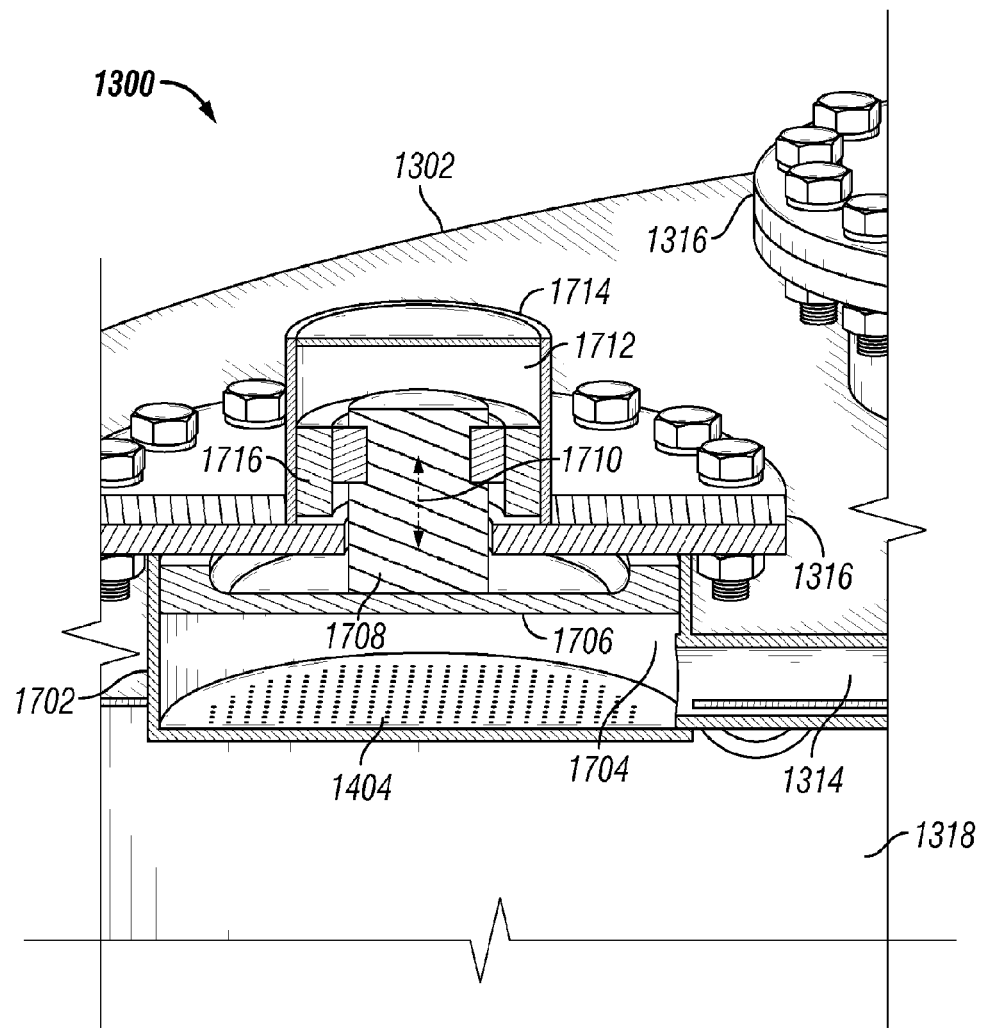

Now with reference to FIG. 17, which further illustrates housings 1316 in a perspective and cross-sectional view, and showing the interior of apparatus 1300. Housing 1316 is disposed upon and within upper plate 1302, and includes a lower portion 1702 which supports perforated membrane 1404. On side of perforated membrane 1404 is exposed to mist chamber 1318, and the opposite side exposed to housing chamber 1704. A slurry may move through conduit 1314, into housing chamber 1704, through perforated membrane 1404, and emit into mist chamber 1318 in the form of slurry bodies. A system for energizing the slurry may be disposed within housing chamber 1704. In some aspects of the disclosure, the system may include a movable diaphragm 1706 in contact with slurry on one side, and connected with a piston 1708 on an opposing side. Piston 1708 may oscillate in opposing directions as indicated by arrow 1710, and move diaphragm 1706 in like manner, thus energizing or otherwise moving and/or varying pressure on the slurry present in housing chamber 1704. Piston 1708 may be driven by any suitable technique, including mechanical, pneumatic, hydraulic, electrical, piezoelectrical, and the like, all of which are within the scope and spirit of the disclosure, and applicable for energizing perforated membranes in accordance with the disclosure. In the illustration shown in FIG. 17, piston 1708 is accommodated within housing chamber 1704 and cylinder 1712 formed in an upper portion 1714 of housing 1316. As piston 1708 oscillates in opposing direction within housing chamber 1704 and cylinder 1712, diaphragm 1706 is moved and energy imparted into the slurry. As indicated above, piston 1708 may be moved by any suitable technique, and shown is an electrical or piezoelectrical device 1714 for inducing oscillating motion upon piston 1708. While the embodiment depicted in FIG. 17 shows a piston and diaphragm oscillating along one axis, it is also within the scope of the disclosure to have a piston and diaphragm, or other energizing arrangement, which moves along a plurality of axes (such as x, y and z, for example) to impart energy into the slurry. In yet further aspects of the disclosure, housing and perforated membrane arrangements may further include components, which may be utilized or activated to clean the interior of the housing, the membrane, perforations through the membrane, and any combinations thereof. An example of such components include ultrasonic devices (i.e. ultrasonic pens, ultrasonic transducers, etc.) which may be activated and impart ultrasonic energy into the slurry, housing and/or membrane.

The disclosure also relates to methods to prop open subterranean formation fractures which includes introducing the proppants into a subterranean formation penetrated by a wellbore, and placing the proppant in the fractures. In fracturing operation use, the proppant particles may be combined with a carrier fluid that is then introduced into a well bore of a subterranean formation. The carrier fluid, referred to in the art as a fracturing fluid, is pumped through a well bore into a subterranean zone to be stimulated at a rate and pressure such that fractures are formed and extended into the subterranean zone. At least a portion of the fracturing fluid carries proppant particles into the formed fractures. The particles are deposited in the fractures and the fracturing fluid leaks off into the subterranean zone and/or is returned to the surface. The proppant functions to prevent the formed fractures from closing whereby conductive channels are formed through which produced fluids can flow to the well bore. The carrier fluid may be any viscosified or non-viscosified carrier fluid, such as those that are well known to those skilled in the art including, but not limited to a gas and/or liquid, energized fluid, foam, like aqueous solutions, such as water, brine solutions, and/or synthetic solutions.

In some other aspects, the proppants are used in a gravel packing where proppant is carried to a subterranean producing zone in which a gravel pack is to be placed by a hydrocarbon or water carrying fluid (or other carrier source, such as a fluid, energized fluid, foam, gas, and the like). That is, the particles are suspended in the carrier fluid, which can be viscosified and the carrier fluid is pumped into the subterranean producing zone in which a gravel pack is to be placed. Once the particles are placed in the zone, the treating fluid leaks off into the subterranean zone and/or is returned to the surface. The gravel pack produced functions as a filter to separate formation solids from produced fluids while permitting the produced fluids to flow into and through the well bore.

The disclosure is not only limited to the fabrication of proppant containing ceramic particles, but may also be applied to matrix materials and filler materials for cements, cement fiber board systems, drywall fillers, caulks, polymeric systems and other such applications that require high strength filler materials.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method comprising:
providing an aqueous slurry of a reactant, a dispersant, and ceramic forming raw materials;

flowing the slurry through at least one perforated membrane to form slurry bodies to contact a mist comprising a coagulating agent to gel the reactant;

receiving the slurry bodies in a collecting hopper; and drying the slurry bodies to form particles.

2. The method of claim 1 wherein the aqueous slurry comprises bauxite containing less than eighty percent alumina.

3. The method of claim 1 wherein the aqueous slurry comprises a rheology modifying agent.

4. The method of claim 1 wherein the slurry bodies flow through the perforated membrane by extrusion.

5. The method of claim 1 wherein the dispersant is a surfactant.

6. The method of claim 5 wherein the surfactant at least partially influences slurry body shape, size, or combination thereof.

7. The method of claim 1 wherein the perforated membrane comprises a substantially planar surface.

8. The method of claim 1 wherein collecting hopper is a bathless container.

9. The method of claim 1 wherein the particles formed are proppant particles.

10. The method of claim 1 further comprising a sintering step.

11. The method of claim 10 wherein the particles are sintered at a temperature in the range of from about 1400° C. to about 1650° C.

12. The method of claim 1 wherein the aqueous slurry has a solids content of from about 60% by weight to about 88% by weight.

13. The method of claim 1 wherein the aqueous slurry further comprises at least one ingredient influencing the rheology properties of the slurry.

14. The method of claim 13 wherein the ingredient is attapulgite.

15. The method of claim 1 wherein the aqueous slurry comprises about greater than or equal to 46% by weight alumina, about less than or equal to 18% by weight silica and about less than or equal to 10% by weight zirconia or derivatized zirconia oxides.

16. The method of claim 1 wherein the aqueous slurry further comprises at least one of glass, flyash or soda ash.

17. The method of claim 1 wherein the aqueous slurry further comprises graphite coated iron particles, graphite coated magnetic powder, or combination thereof.

18. The method of claim 1 wherein the reactant is a polysaccharide.

19. The method of claim 18 wherein the polysaccharide is an alginate.

20. The method of claim 1 wherein the coagulation agent is calcium chloride.

21. The method of claim 1 wherein the slurry is energized as it flows through the perforated membrane.

22. The method of claim 1 further comprising receiving the slurry bodies in a bath, wherein the bath comprises a foam disposed thereon.

23. The method of claim 1 wherein the at least one perforated membrane is a plurality of perforated membranes.

24. A method comprising:

providing an aqueous slurry of ceramic forming raw materials, the slurry further comprising a reactant and a dispersant;

flowing the slurry through a perforated membrane while energizing the slurry to form slurry bodies;

passing the slurry bodies through a mist in a chamber, the mist comprising a coagulation agent to react with the reactant in the slurry bodies;

receiving the slurry bodies in a collecting hopper; and drying the slurry bodies to form particles.

25. A method of hydraulic fracturing a subterranean formation penetrated by a wellbore, the formation having a fracturing stress, the method comprising:

pumping a fracturing fluid into the wellbore at a pressure above the fracturing stress of the formation; and adding proppant particles to the fracturing fluid and delivering the proppant particles and the fluid into the wellbore, wherein the proppant particles are prepared by providing an aqueous slurry of ceramic forming raw materials and a reactant, flowing the slurry through a perforated membrane to form slurry bodies to contact a mist comprising a coagulating agent to gel the reactant, receiving the slurry bodies in a collecting hopper, and drying the slurry bodies to form the proppant particles.

26. A system comprising:

a storage tank for providing a slurry of a reactant, a dispersant, and particle forming raw materials;

a perforated membrane for forming slurry bodies from the slurry;

a misting chamber disposed adjacent the perforated membrane, the misting chamber providing a mist comprising a coagulating agent to gel the reactant; and, a collecting hopper disposed adjacent the misting chamber;

wherein the storage tank is fluidly connected with perforated membrane.

* * * * *